US010446016B2

(12) United States Patent
Mattiaccio, III et al.

(10) Patent No.: US 10,446,016 B2
(45) **Date of Patent: *Oct. 15, 2019**

(54) ADVANCED MOBILE EMERGENCY COMMUNICATION SYSTEM

(71) Applicant: SHIELDtech Inc., Fairfield, NJ (US)

(72) Inventors: Ralph J. Mattiaccio, III, Mahwah, NJ (US); Christopher J. Coppola, Fairfield, NJ (US)

(73) Assignee: SHIELDtech Inc., Mahwah, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,055

(22) Filed: Sep. 26, 2017

(65) Prior Publication Data

US 2018/0025619 A1 Jan. 25, 2018

Related U.S. Application Data

(63) Continuation of application No. 14/796,418, filed on Jul. 10, 2015, now Pat. No. 9,773,404.

(60) Provisional application No. 62/023,422, filed on Jul. 11, 2014.

(51) Int. Cl.

| | |
|---|---|
| ***H04M 11/04*** | (2006.01) |
| ***G08B 25/01*** | (2006.01) |
| ***G08B 25/00*** | (2006.01) |

(52) U.S. Cl.
CPC ......... *G08B 25/016* (2013.01); *G08B 25/009* (2013.01)

(58) Field of Classification Search
None
See application file for complete search history.

(56) References Cited

U.S. PATENT DOCUMENTS

| | | | | |
|---|---|---|---|---|
| 5,838,237 | A * | 11/1998 | Revell | G01S 1/68 340/456 |
| 8,249,547 | B1 | 8/2012 | Fellner | |
| 8,351,895 | B2 | 1/2013 | Penix et al. | |
| 8,461,983 | B2 * | 6/2013 | McCauley | 340/539.13 |
| 9,037,108 | B1 * | 5/2015 | Delatorre | 455/404.1 |
| 9,137,383 | B2 * | 9/2015 | Estrada et al. | |
| 2005/0075116 | A1 | 4/2005 | Laird et al. | |
| 2007/0032218 | A1 | 2/2007 | Choi | |
| 2007/0082652 | A1 * | 4/2007 | Hartigan | G08B 21/0277 455/404.2 |

(Continued)

*Primary Examiner* — Brent Swarthout
(74) *Attorney, Agent, or Firm* — Young Basile Hanlon & MacFarlane, P.C.

(57) ABSTRACT

Described herein is a module mobile emergency notification system. This system includes a module wireless emergency alerting device for receiving a user input indicative of an emergency situation and communicating the user input with a base station, a base station for communicating with the alerting device, and a mainframe for communicating with the base station and an alert notification display. The system allows a user to notify emergency responders of their emergency situation. The alerting device acts as a wireless panic system that is tied to a user's base station. Once triggered, the alerting device sends a signal to the base station which uses the on board Global Positioning System (GPS) to calculate its location. The base station sends the GPS coordinates and a user's profile information to the mainframe. The mainframe processes the information and displays it on an alert notification display for emergency responders or others to view.

19 Claims, 10 Drawing Sheets

(56) References Cited

U.S. PATENT DOCUMENTS

| | | | | |
|---|---|---|---|---|
| 2008/0214142 | A1* | 9/2008 | Morin | G08B 25/016 455/404.2 |
| 2010/0075655 | A1* | 3/2010 | Howarter | B60R 25/2009 455/420 |
| 2011/0012729 | A1* | 1/2011 | Hess | G08B 13/1409 340/539.13 |
| 2011/0071880 | A1* | 3/2011 | Spector | H04W 4/90 340/573.1 |
| 2012/0023592 | A1 | 1/2012 | Wilson | |
| 2013/0290013 | A1 | 10/2013 | Forrester | |
| 2014/0046391 | A1 | 2/2014 | Cowan et al. | |
| 2014/0106677 | A1 | 4/2014 | Altman | |
| 2014/0378089 | A1 | 12/2014 | Monros | |
| 2015/0002293 | A1* | 1/2015 | Nepo | G08B 15/004 340/539.13 |
| 2015/0208220 | A1 | 7/2015 | Hulan | |
| 2015/0358794 | A1* | 12/2015 | Nokhoudian | H04W 4/90 455/404.1 |

* cited by examiner

ADVANCED MOBILE EMERGENCY COMMUNICATION SYSTEM

CROSS REFERENCE TO RELATED APPLICATIONS

This application is a continuation of U.S. patent application Ser. No. 14/796,418, filed Jul. 10, 2015, now U.S. Pat. No. 9,773,404, which claims the benefit of U.S. Provisional Application No. 62/023,422, filed Jul. 11, 2014, which is incorporated by reference as if fully set forth.

FIELD OF INVENTION

This application is related to an emergency notification.

BACKGROUND

Every day, thousands of people find themselves in life threatening situations. Unfortunately, we live in a world where theft, rape and murder is an all too familiar headline. When situations like these arise, people are limited in the ways they can react. A person's first instinct is to call for help, usually 911, and alert the police of the situation. Fortunately, most people have a cellular phone so they can call from almost any location. However, in a state of high anxiety, fiddling for a phone, dialing, and speaking to the police can be a difficult and time-consuming process. Every second counts in life-threatening situations.

With all the advances in technology over the past decade, people are still using an emergency system that dates back to the 1960s. Solutions have been developed that allows the people to avoid the dialing aspect of calling the police. A Life Alert® system (a registered trademark of Life Alert Emergency Response, Inc.), allows people to contact an emergency representative with a push of a button of a wireless wearable pendant. The technology used in Life Alert® bounds the person using the service to a confined area, any call requested outside of that area does not go through. For college campus security, most campuses have "Blue Light" emergency phones scattered around their campus which puts you in direct contact with a police officer after finally locating one of these phones. Both of these solutions are more efficient ways of reaching out for help than traditional calls, however, they still require the person to speak and tell the responder who they are, where they are and what the nature of the situation is.

SUMMARY

Described herein is a module mobile emergency notification system. This system includes a module wireless emergency alerting device for receiving a user input indicative of an emergency situation and communicating the user input with a base station, a base station for communicating with the alerting device, and a mainframe for communicating with the base station and an alert notification display.

The system allows a user to notify emergency responders of their emergency situation quickly and discreetly. The module wireless emergency alerting device acts as a wireless panic system that is tied to a user's base station for example a cellular smartphone. Once triggered, the module wireless emergency alerting device sends a signal to the base station which then uses the on board Global Positioning System (GPS) to calculate its location. Then the base station sends the GPS coordinates and a user's profile information to the mainframe. The mainframe then processes the information and displays it on an alert notification display for emergency responders or others to view.

DETAILED DESCRIPTION

Figure 1:
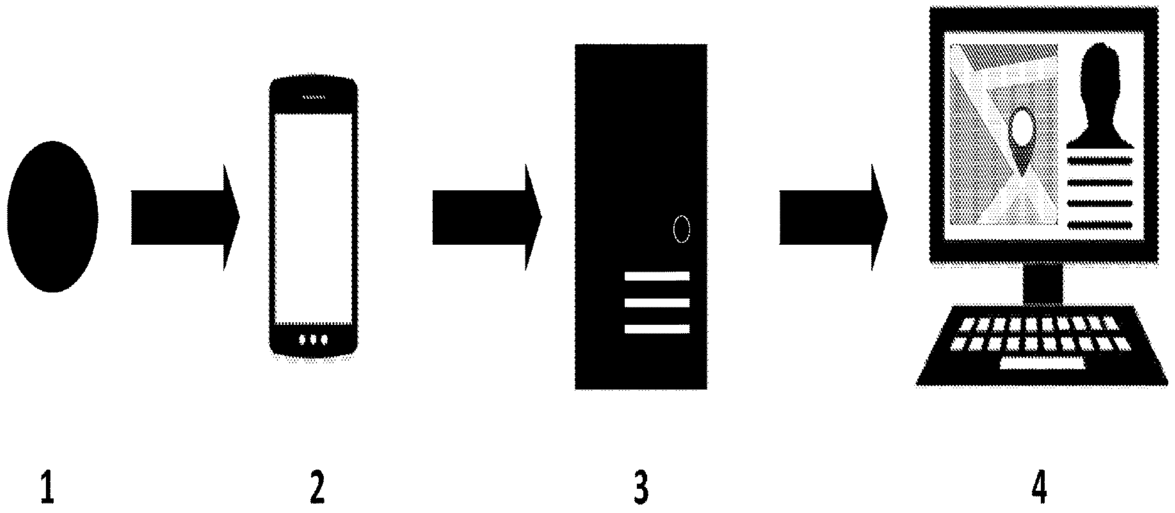
FIG. 1 is a schematic view of an example overall module mobile emergency notification system in accordance with some embodiments.

It is to be understood that the figures and descriptions of embodiments of a module mobile emergency notification system have been simplified to illustrate elements that are relevant for a clear understanding, while eliminating, for the purpose of clarity, many other elements found in typical vehicle systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

The non-limiting embodiments described herein are with respect to module mobile emergency notification system. Other electronic devices, modules and applications may also be used in view of these teachings without deviating from the spirit or scope as described herein. The module mobile emergency notification system may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the module mobile emergency notification system although it may be described with respect to a particular embodiment.

FIG. 1 is a schematic view of an example overall module mobile emergency notification system in accordance with some embodiments. A module wireless emergency alerting device 1 receives a user input indicative of an emergency situation and communicates the user input with a base station 2. The module wireless emergency alerting device 1 transmits a signal to a base station 2 via a wireless communication protocol when the user interacts with a pushbutton, switch, decoupling mechanism, touch sensor and/or like mechanisms. The module wireless emergency alerting device 1 is also a wearable device that can be mounted and dismounted in various configurations as shown, for example, in FIG. 2. In another embodiment, the module wireless emergency alerting device 1 has a mechanical and/or electrical trigger protection to avoid unintentional user interactions. The base station 2 communicates with the module wireless emergency alerting device 1 and a mainframe 3 via a wireless communication protocol. The base station 2 acts as a middle man between the two devices, leveraging existing technology on the base station 2. The base station 2 includes a software application or system firmware pre-installed or added by the user. The mainframe 3 communicates with the base station 2 via a wireless protocol. The mainframe 3 then can process the information received from the base station 2 and display it on an alert notification display 4 such as a web portal or other visual display. The alert notification display 4 is a web-based emergency responder application view on any internet-ready device. In another embodiment, a text message may be generated to the appropriate people, organization and the like.

The base station 2 may be a smartphone, mobile device, laptop, notebook, tablet, smartwatch and any like device. The mainframe 3 maybe any processing system capable of presenting or displaying information on to an alert notification display 4 such as a web portal or similar alert notification display.

Figure 2:
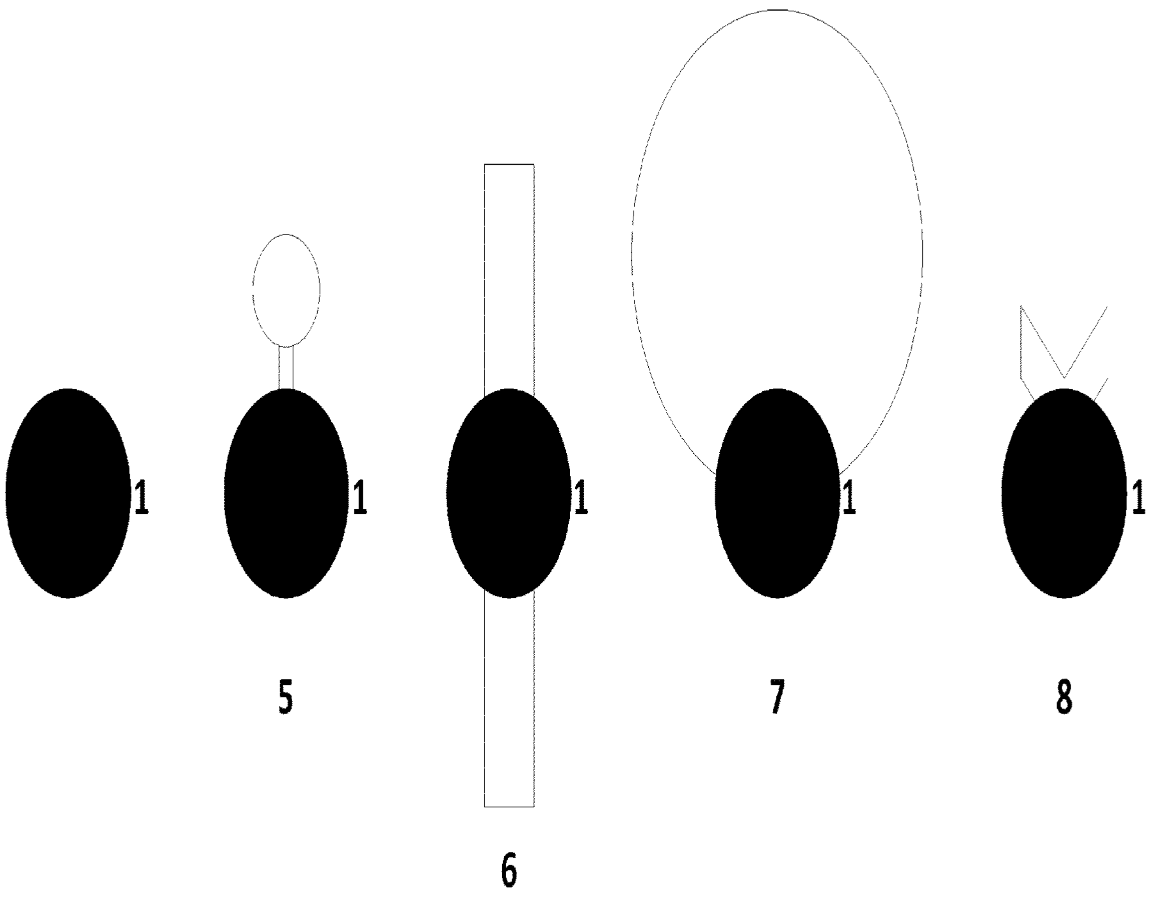
FIG. 2 is a depiction of an example module wireless emergency alerting device in multiple wearable configurations in accordance with some embodiments.

FIG. 2 depicts an example module wireless emergency alerting device 1 in multiple attachable and/or wearable configurations. A key ring member 5 will allow the user to mount and dismount the module wireless emergency alerting device 1 on to a key ring that can be attached to but not limited to a set of keys, a keychain, an article of clothing, a backpack, a purse and/or handbag. A wearable wrist band member 6 will allow the user to mount and dismount the module wireless emergency alerting device 1 into a wearable wrist band that can be worn around the user's wrist. A necklace member 7 will allow the user to mount and dismount the module wireless emergency alerting device 1 on to a wearable necklace that the user can wear around the neck. A clip member 8 will allow the user to mount and dismount the module wireless emergency alerting device 1 on to a mechanical clip that can be attached to the user's clothing, backpack, purse and/or handbag.

Figure 3:
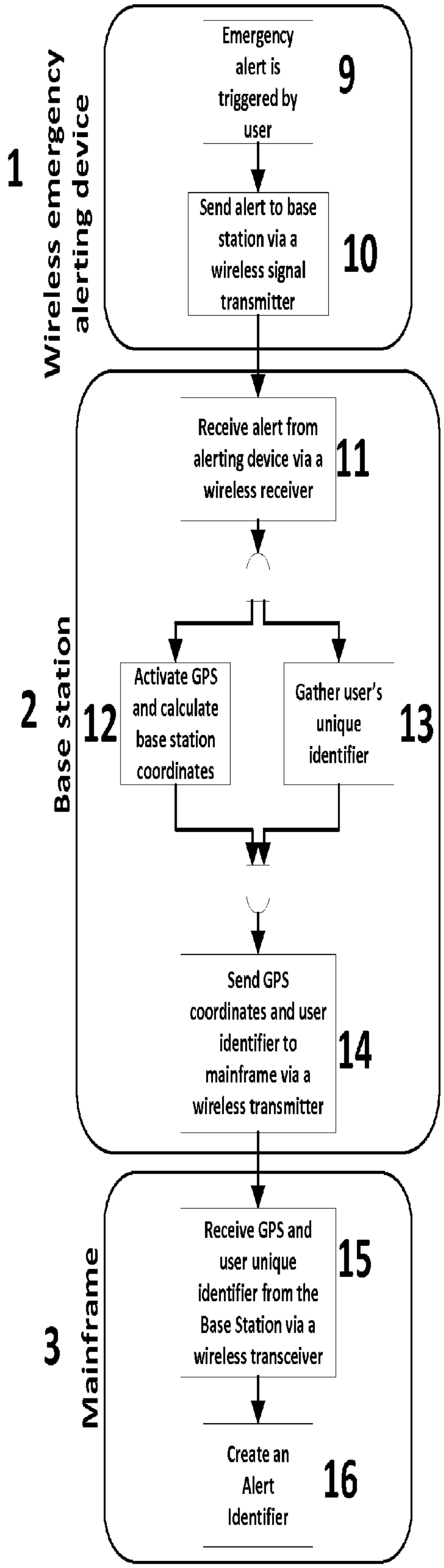
FIG. 3 is a logic chart depicting an example flow of information for the overall mobile emergency notification system in accordance with some embodiments.

FIG. 3 is a logic chart depicting an example flow of information for the overall module mobile emergency notification system. In an emergency situation, using the module wireless emergency alerting device 1, the user will trigger an alert via an integrated pushbutton, switch, and decoupling mechanism and/or touch sensor 9. A decoupling mechanism can mean but is not limited to an action where the user pulls apart the wearable member that the module wireless emergency devices are mounted on, which in turn triggers the alert. In another embodiment, the module wireless emergency alerting device 1 has a mechanical and/or electrical trigger protection to avoid unintentional user interactions. The module wireless emergency alerting device 1 then sends the alert notification to the base station 2 via a wireless signal transmitter 10 via a wireless communications protocol such as, but not limited to Bluetooth, Bluetooth Low Energy, Wi-Fi, radio frequency identification (RFID technologies), cellular data connection, and/or high speed data connections such as 3G, and 4G Long-Term Evolution. The base station 2 includes a software application or system firmware pre-installed or added by the user. The base station 2 receives the alert notification from the module wireless emergency alerting device 1 via a wireless receiver 11. The base station then activates its Global Positioning System (GPS) and calculates its location on a latitude, longitude and altitude coordinate system 12. Additionally, the base station can leverage other technologies, if available to assist in calculating its location such as, but not limited to Bluetooth, Bluetooth Low Energy, Wi-Fi, radio frequency identification (RFID technologies), cellular data connection, and/or high speed data connections such as 3G, 4G Long-Term Evolution and atmospheric pressure measuring technology, such as a barometer 12. At the same time, the base station gather's a user's unique identifier based on user inputs 13. The base station then sends the GPS coordinates and the user unique identifier to the mainframe 3 via a wireless transmitter 14. The mainframe 3 receives the GPS coordinates and the user unique identifier from the base station via a wireless transceiver 15. The mainframe then stores this data and creates a unique Alert Identifier for future retrieval. The Alert Identifier references the user unique identifier, current location, location history, and other information associated with the emergency alert 16.

Figure 4:
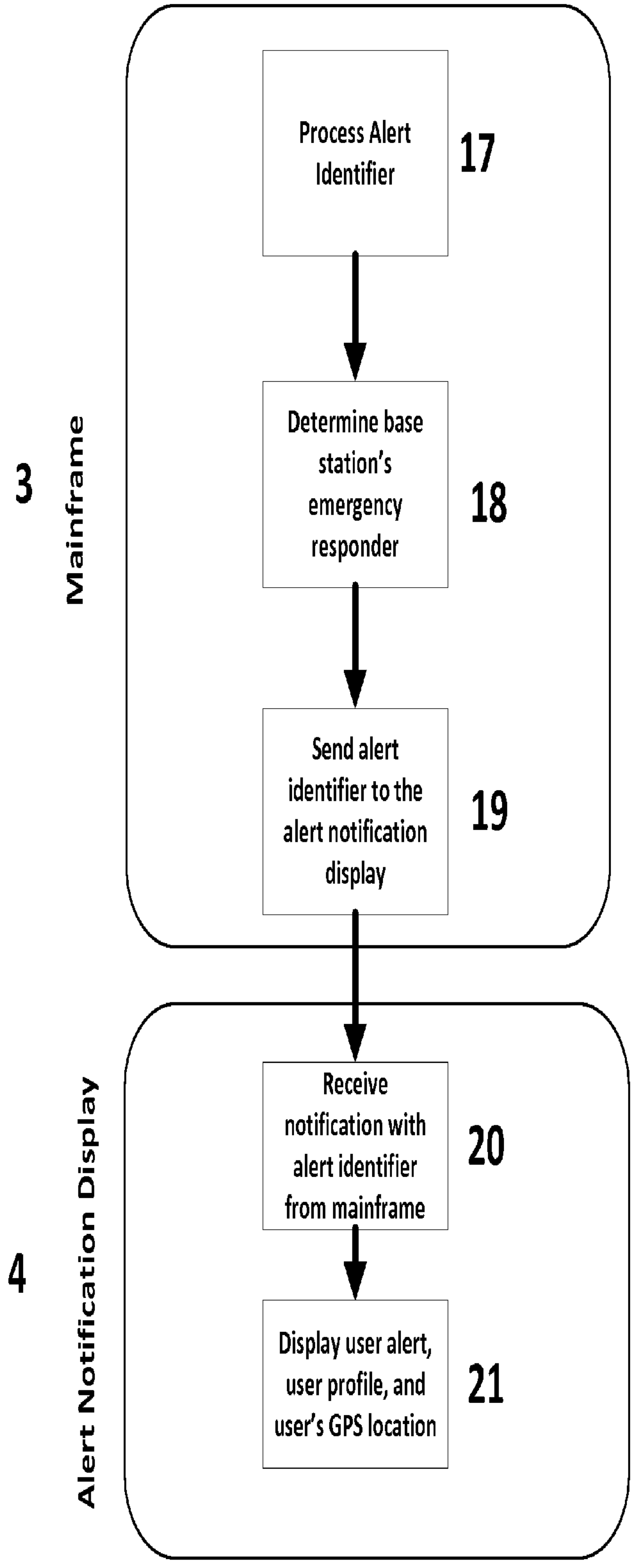
FIG. 4 is a logic chart depicting an example flow of information for communication between a mainframe and an alert notification display interface in accordance with some embodiments.

FIG. 4 is a logic chart depicting an example processing and communication of an emergency alert with a direct connection between the mainframe 3 and an alert notification display 4. The mainframe 3 processes the Alert Identifier 17 to index the specific alert stored in the system and retrieve the location of the emergency and associated User Identifier. Using the location and profile data of the user, the mainframe 3 can determine which dispatcher is most suitable to receive information about the emergency alert 18. The mainframe 3 sends the corresponding Alert Identifier 17 to the alert notification display 4 of the selected dispatcher 19.

The selected alert notification display receives a notification containing an Alert Identifier 17 from the mainframe 20. The mainframe 3 processes the Alert Identifier 17 to index the specific alert stored in the system and retrieve associated data for that alert, including but not limited to, the identifier of the user who placed the alert, initial location when alert was placed, user's current location, location history since the alert has been placed, time and date the alert was placed, and alert response status. The retrieved data is sent to and displayed on the alert notification display 4 of the selected dispatcher 21.

Figure 5:
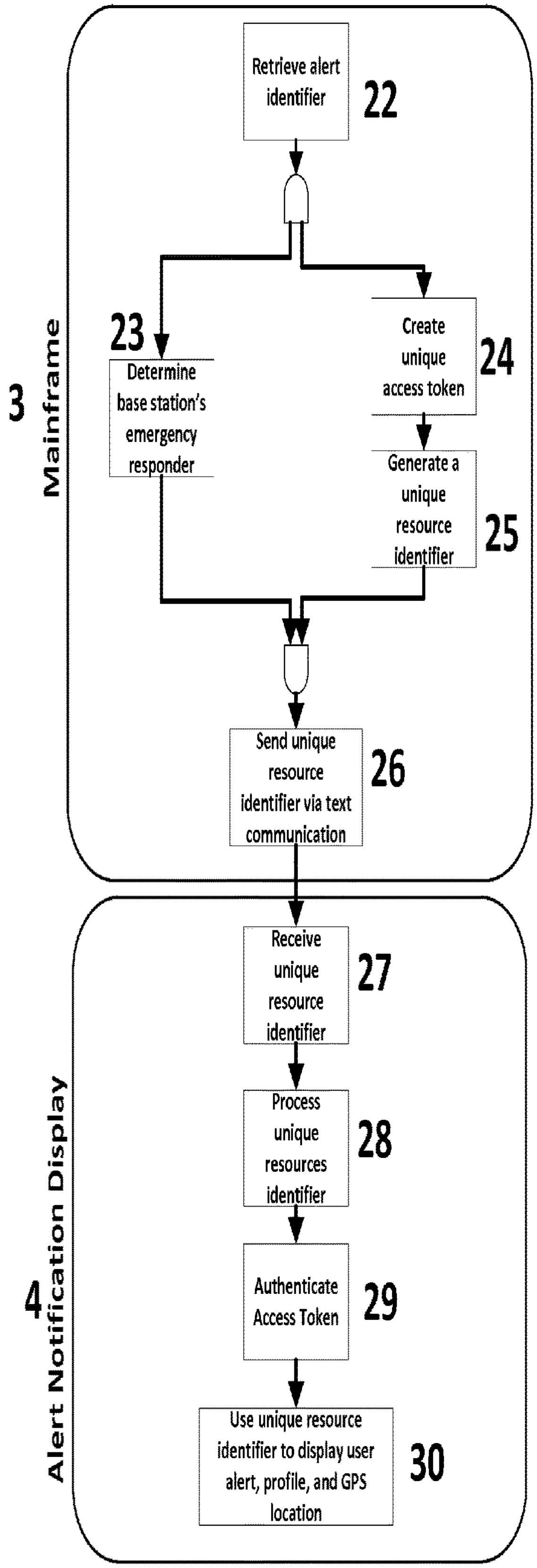
FIG. 5 is an logic chart depicting an example flow of information embedded in a unique resource identifier for the communication between a mainframe and a text messaging service in accordance with some embodiments.

FIG. 5 is a logic chart depicting an example processing and communication of an emergency alert to a member outside the system. The mainframe 3 retrieves the Alert Identifier 22 for the current alert to index the specific alert stored in the system and retrieve the location of the emergency and associated User Identifier. Two actions then occur. Using the location and profile data of the user, the mainframe 3 can determine which dispatcher is most suitable to receive information about the emergency alert 23. Additionally, the mainframe 3 generates a Unique Access Token 24 which will be used for future authentication. A Unique Resource Identifier is then generated 25 which will be used to communicate the current Alert Identifier 22 and Unique Access Token 24 through the outside members of the system. This Unique Resource Identifier will be sent via text communication to any device capable of receiving such communication 26. The text communication can be sent using a standardized protocol, such as SMS and TCP/IP.

The Unique Resource Identifier can be sent by the outside member to the alert notification display 4. The alert notification display 4 then receives the Unique Resource Identifier 27. The Unique Resource Identifier is then processed by the alert notification display to retrieve the information associated with that resource identifier 28. In this case, this is the Unique Access Token and the Alert Identifier. The alert notification display 4 authenticates the Unique Access Token 29. Upon successful authentication, the Alert Identifier 22 is then used to retrieve the associated alert information, including user profile information and location data. This is displayed to the user on the screen via the alert notification display 30.

Figure 6:
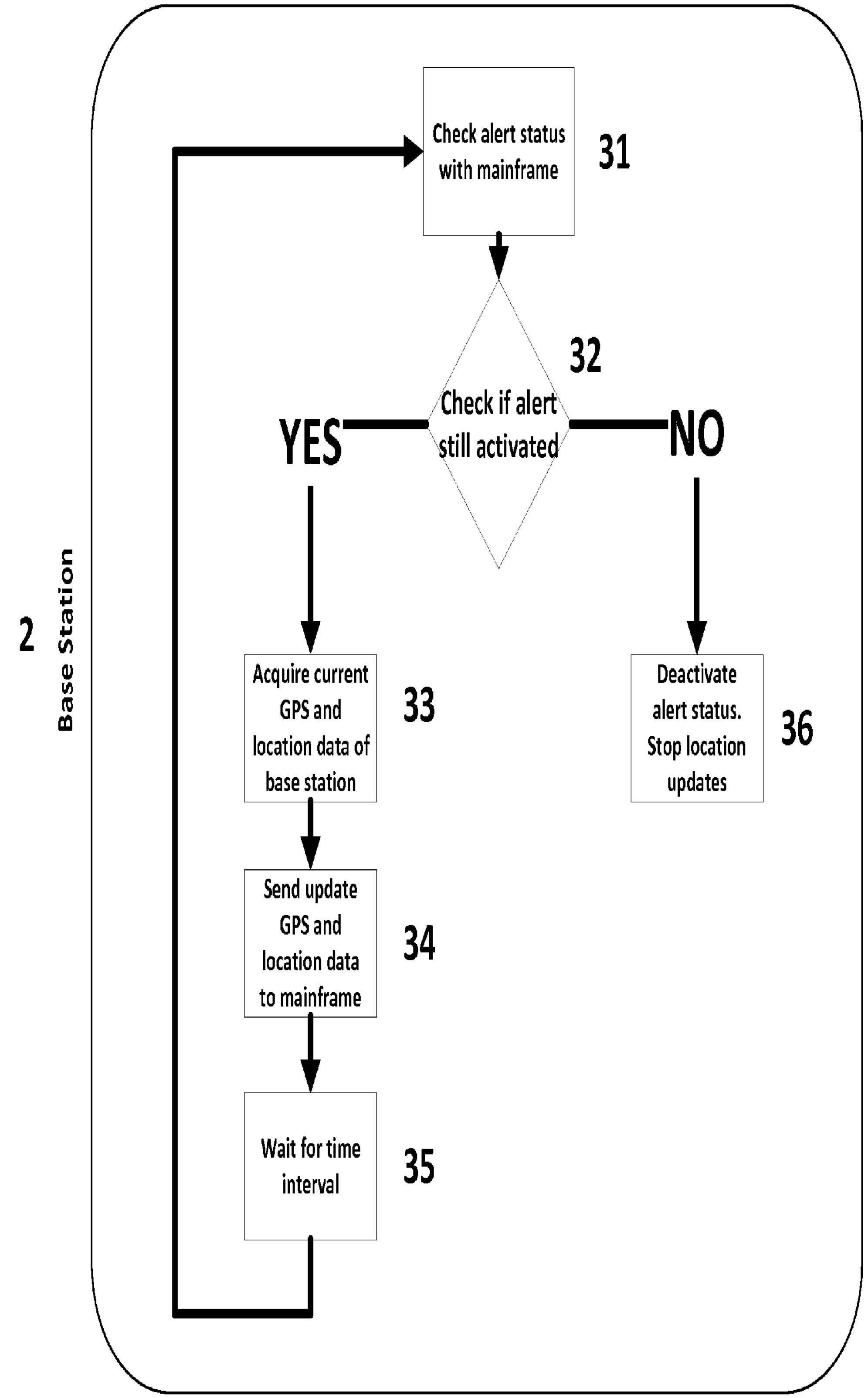
FIG. 6 is a logic chart depicting an example process of determining whether a base station should continue sending mainframe GPS coordinates in accordance with some embodiments.

FIG. 6 is a logic chart depicting an example current status of the emergency alert in the system and the base station performing an action based on this status. The base station checks with the mainframe 31 to see what the current alert status is. If the alert is still in progress or activated 32, the base station will acquire the current location of the base station 33. The location is usually provided in GPS coordinates. This location data is then sent to the mainframe 34. The base station then waits a certain time interval 35 before checking the alert status with the mainframe 31 again. If the alert status is determined to be no longer in an active state, then the base station will mark the current alert as deactivated and end the emergency alert process 36.

Figure 7:
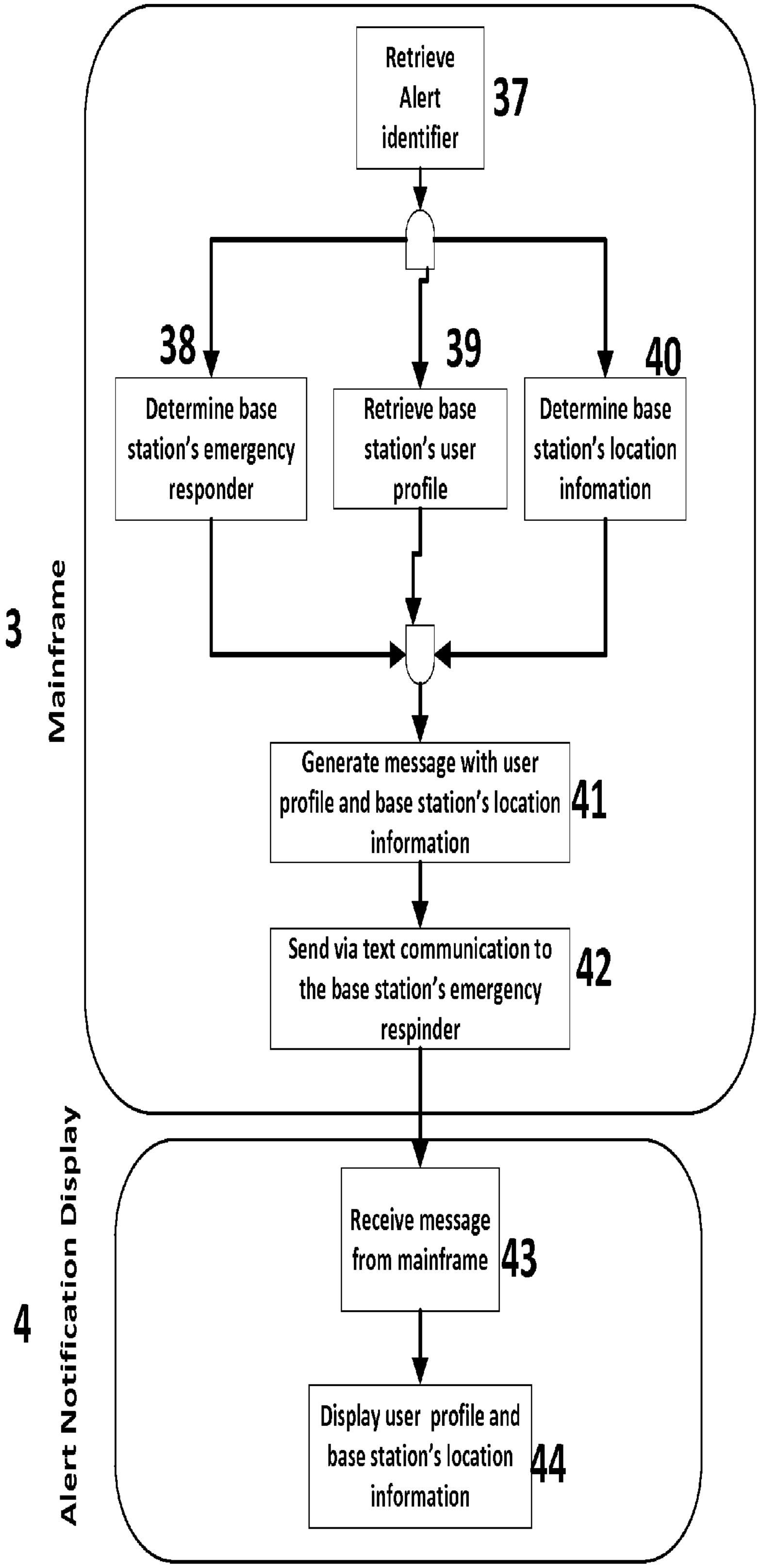
FIG. 7 is a logic chart depicting an example flow of information through a visual communication or data protocol for the communication between a mainframe and a text messaging service in accordance with some embodiments.

FIG. 7 is a logic chart depicting an example flow of information through a visual communication or data protocol for the communication between a mainframe 3 and a text messaging service. The mainframe 3 retrieves the Alert Identifier 37 for the current alert to index the specific alert stored in the system and retrieve the location of the emergency and associated User Identifier. Three actions then occur. First, the mainframe 3 can determine the base station's emergency responder that is most suitable to receive information about the emergency alert 38. Second, using the Alert Identifier, the mainframe 3 retrieves the base station's user profile information 39. Finally, the mainframe 3 determines base station's location information 40. A message will then be generated containing the user's profile information and base station's location information 41. The message is then sent via text communication to the base station's emergency responder 42 assuming the responder has a device capable of receiving such communications. The text communication can be sent using a standardized protocol, such as SMS and TCP/IP.

The message can be sent by the outside member to the alert notification display 4. The alert notification display 4 receives the message from the mainframe 43. The alert notification display 4 displays the user's profile information and base station's location information 44.

Figure 8:
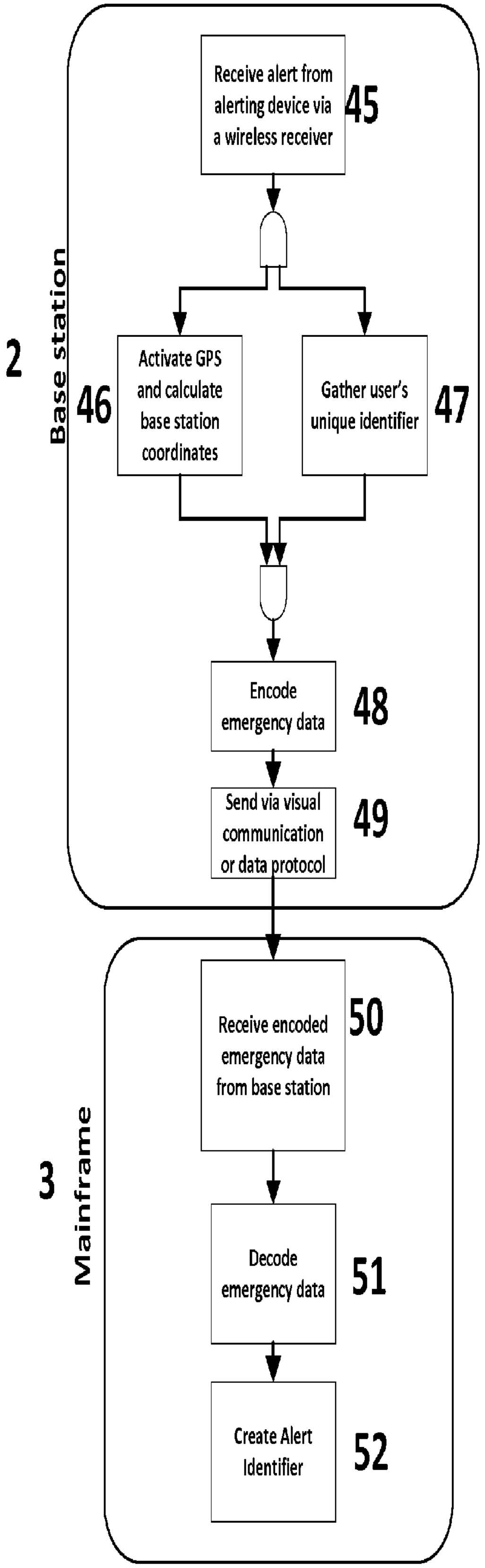
FIG. 8 is a logic chart depicting an example flow of information where a base station embeds computer data related to the emergency and is communicated and decode to the mainframe in accordance with some embodiments.

FIG. 8 is a logic chart depicting an example flow of information where a base station 2 embeds computer data related to the emergency and is communicated and decode to the mainframe 3. The base station 2 receives the alert notification from the module wireless emergency alerting device 1 via a wireless receiver 45. The base station then activates its Global Positioning System (GPS) and calculates its location on a latitude, longitude and altitude coordinate system 46. Additionally, the base station can leverage other technologies, if available to assist in calculating its location such as, but not limited to Bluetooth, Bluetooth Low Energy, Wi-Fi, radio frequency identification (RFID technologies), cellular data connection, and/or high speed data connections such as 3G, 4G Long-Term Evolution and atmospheric pressure measuring technology, such as a barometer 46. At the same time, the base station gather's a user's unique identifier based on user inputs 47. The base station then encodes the emergency data so the text cannot be read by a human 48. The encoded emergency data is then sent via a visual communication or data protocol to the mainframe 49. The mainframe 3 receives the encoded emergency information from the base station 50. The mainframe then decodes the emergency data 51 so that it could be read by a human. Using that decoded emergency data, the mainframe 3 creates an Alert Identifier 52.

Figure 9:
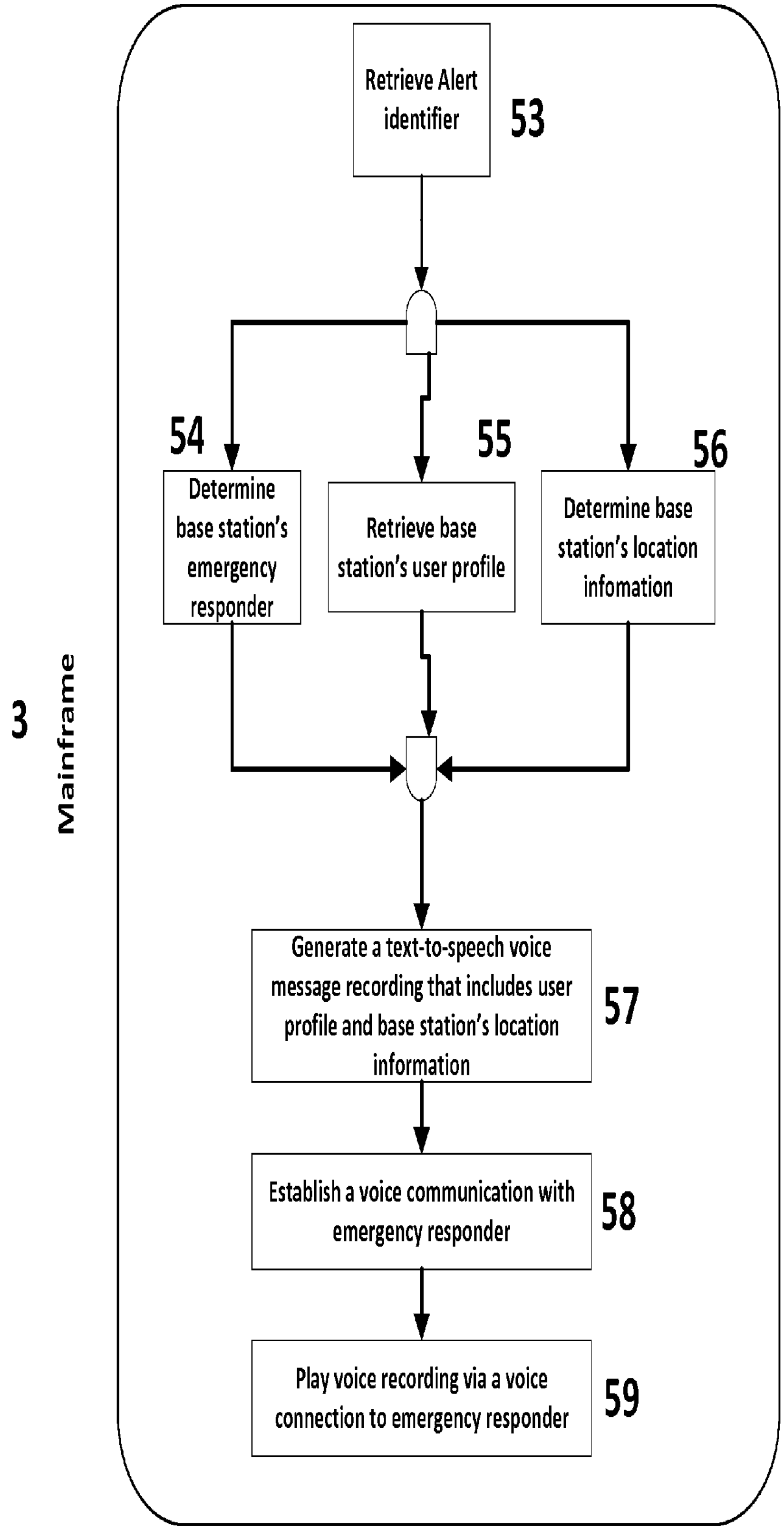
FIG. 9 is a logic chart depicting an example flow of information for audible communication between a mainframe and an emergency responder in accordance with some embodiments.

FIG. 9 is a logic chart depicting an example flow of information for audible communication between a mainframe 3 and an emergency responder. The mainframe 3 retrieves the Alert Identifier 53 for the current alert to index the specific alert stored in the system and retrieve the location of the emergency and associated User Identifier. Three actions then occur. First, the mainframe 3 can determine the base station's emergency responder that is most suitable to receive information about the emergency alert 54. Second, using the Alert Identifier, the mainframe 3 retrieves the base station's user profile information 55. Finally, the mainframe 3 determines base station's location information 56. The mainframe 3 will then generate a text-to-speech voice message recording that included the user's profile information and base station's location information 57. The mainframe 3 will then establish a voice communication with the emergency responder using an audible communication technology such as, but not limited to a telephone or VoIP (Voice over Internet Protocol) 58. Once the voice communication is established, the mainframe will play the voice recording to the emergency responder 59.

Figure 10:
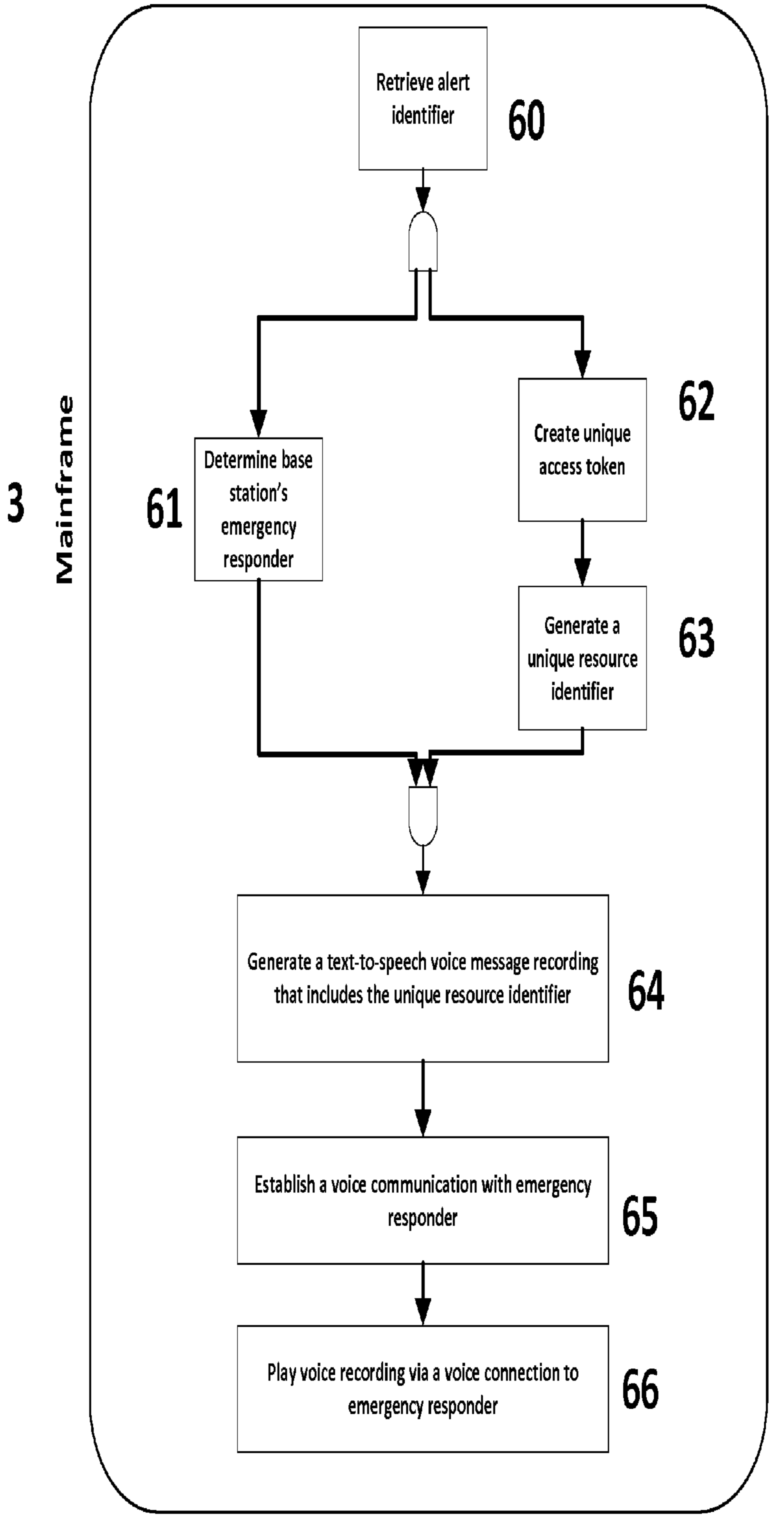
FIG. 10 is a logic chart depicting an example flow of information where the mainframe audibly communicates a unique resource identifier to an emergency responder in accordance with some embodiments.

FIG. 10 is a logic chart depicting an example flow of information where the mainframe 3 audibly communicates a unique resource identifier to the emergency responder. The mainframe 3 retrieves the Alert Identifier 60 for the current alert to index the specific alert stored in the system and retrieve the location of the emergency and associated User Identifier. Two actions then occur. Using the location and profile data of the user, the mainframe 3 can determine the base station's emergency responder that is most suitable to receive information about the emergency alert 61. Additionally, the mainframe 3 generates a Unique Access Token 62 which will be used for future authentication. A Unique Resource Identifier is then generated 63 which will be used to communicate the current Alert Identifier 60 and Unique Access Token 62 through the outside members of the system. The mainframe 3 will then generate a text-to-speech voice message recording that includes the unique resources identifier 64. The mainframe 3 will then establish a voice communication with the emergency responder using an audible communication technology such as, but not limited to a telephone or VoIP (Voice over Internet Protocol) 65. Once the voice communication is established, the mainframe will play the voice recording to the emergency responder 66.

In general, a module mobile emergency notification system for notifying a mainframe of an emergency situation includes a module wireless emergency alerting device configured to receive a user input indicative of an emergency situation and to communicate the user input with a base station; the base station configured to communicate with the alerting device; a mainframe configured to communicate with the base station; and an alert notification display configured to interact with the mainframe. In an embodiment, the module wireless emergency alerting device transmits a signal to the base station via a wireless communication protocol. In an embodiment, the module wireless emergency alerting device transmits a signal to the base station when the user interacts with at least one of an integrated pushbutton, switch, decoupling mechanism and/or touch sensor. In an embodiment, the module wireless emergency alerting device has a mechanical and/or electrical trigger protection to avoid unintentional user interactions. In an embodiment, the alert notification display is a web-based emergency responder application viewable on any internet-ready device. In an embodiment, an alert notification display shows current and previous emergency alert information including at least one of user profile and photo of a person in distress, their location history, and other information provided in the system.

In an embodiment, the module wireless emergency alerting device can be mounted and dismounted in various configurations to allow the user to selectively attach the device to their person, an article of clothing or an accessory using at least one of a key ring member, a wearable wrist band member, a wearable necklace member, and/or clip-able mechanism member.

In an embodiment, the base station determines its location via at least one of Global Positioning Services (GPS) or Global Navigation Satellite System (GNSS) functionality, and continuously updates on a latitude, longitude and altitude coordinate system. In an embodiment, the base station reads or detects existing local properties and communicates with the mainframe to determine the location of the base station, where the local properties include radio frequencies and atmospheric pressure. In an embodiment, the base station includes a software application or system firmware pre-installed or added by the user.

In general, a method of using a module mobile emergency notification system includes triggering by the user of a pushbutton, switch, decoupling mechanism or touch sensor that is integrated into a module wireless emergency alerting device member, transmitting by the module wireless emergency alerting device member a signal via a wireless communication protocol to a base station, receiving the signal from the module wireless emergency alerting device member activates the base station's location functionality and initiates communication to the mainframe, transmitting by the base station its location information along with a user's unique identifier to a mainframe member over a wireless communication network and retrieving, by the mainframe, the user's information from the mainframe using the user's unique identifier. In an embodiment, the mainframe displays the retrieved information via an alert notification display. In an embodiment, the mainframe generates a unique resource identifier to reference and access a certain emergency alert and its associated data. In an embodiment, the mainframe displays the received information embedded in a unique resource identifier transmitted via a visual communication service. In an embodiment, the mainframe communicates the received information through a visual communication or data protocol. In an embodiment, the base station embeds computer data related to the emergency to be communicated via a visual communication or data protocol. In an embodiment, the mainframe audibly communicates the received information to another party. In an embodiment, the mainframe audibly communicates the unique resource identifier to another party. In an embodiment, an emergency responder uses the unique identifier to access an emergency alert in the system and its associated data.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the systems described herein, and are considered to be within the full scope of the invention.

Although features and elements are described above in particular combinations, each feature or element can be used alone without the other features and elements or in various combinations with or without other features and elements.

What is claimed is:

1. A module mobile emergency notification system for notifying a mainframe of an emergency situation, comprising:

an alert device configured to receive a user alert indicative of an emergency situation;

the alert device, in response to the user alert initiating the emergency situation, configured to only gather a user identifier from user inputs present in the alert device;

a mainframe configured to communicate with the alert device to receive only the user identifier to identify the user alert and configured to use the user identifier to retrieve pre-stored information and to generate a unique access token in response to receiving the user identifier; and an alert notification display configured to interact with the mainframe, to authenticate the unique access token when available, and to access a user profile, a location history of the user, and other information, wherein the alert notification display is viewable on any internet-ready device and shows current and previous emergency alert information including the user profile of a person in distress, the location history of the user, and the other information provided in the system.

2. The system of claim 1, wherein the alert device transmits a signal including only the user identifier to the mainframe when the user interacts with at least one of an integrated pushbutton, switch, decoupling mechanism, touch sensor and standard components on the alert device capable of user interaction.

3. The system of claim 1, wherein at least one of a mechanical, software, and electrical trigger protection is provided to avoid unintentional user interactions.

4. The system of claim 1, wherein the alert device presents visual objects indicative of communicating to the mainframe the emergency situation upon user interaction with the alert device.

5. The system of claim 4, wherein the visual object is one that immediately conveys to the user the purpose of communicating the presence of the emergency situation to the mainframe.

6. The system of claim 1, wherein the alert device presents visual objects indicative of modifying or adding data pertaining to the emergency situation.

7. The system of claim 1, wherein input is accepted from the user using an existing communication capturing mechanism on the alert device, such as a keyboard or microphone to add data to an emergency alert in the system.

8. The system of claim 1, wherein additional data is captured via sensors to be transmitted to the mainframe.

9. The system of claim 8, wherein the alert device monitors the additional data and transmits a signal to the mainframe after certain thresholds.

10. The system of claim 1, wherein authentication of at least one user identifier is required before the alert device transmits the signal to the mainframe.

11. The system of claim 1, wherein the alert device conveys an alert status of the emergency notification in the system, the alert status indicating at least a progress of an alert.

12. The system of claim 11, wherein visual communications are used to indicate the alert status.

13. The system of claim 11, wherein audible communications using alert device functionality are used to indicate the alert status.

14. A method of using a module mobile emergency notification system, the method comprising:

triggering by a user of a user alert via an activation mechanism;

processing, at an alert device, a signal responsive to the triggering of the activation mechanism that initiates gathering of a user unique identifier from user inputs present in the alert device, location functionality and communication with a mainframe;

transmitting, by the alert device, only the location information along with the user unique identifier to the mainframe over a wireless communication network in response to the user triggering the emergency situation;

retrieving, by the mainframe, pre-stored user information from the mainframe using the user unique identifier;

generating, by the mainframe, a unique access token in response to receiving the user unique identifier;

authenticating, at an alert notification display, the unique access token when available;

accessing, at the alert notification display, the retrieved pre-stored user information including user profile, location history of the user and other information; and displaying, at the alert notification display, the retrieved pre-stored user information.

15. The method of claim 14, wherein the alert notification display further displays data captured and transmitted by the alert device to the mainframe including visual communications, and displays location history of the user.

16. The method of claim 14, wherein the alert notification display further provides audible communications received using alert device functionality.

17. The method of claim 15, further comprising:

determining, by the mainframe, a response to the alert based on at least the data, the user information and the user unique identifier.

18. The method of claim 17, wherein the response is at least one of determining an emergency contact and establishing communication with a determined emergency contact.

19. The method of claim 14, wherein the alert device communicates with the mainframe after certain intervals, the alert device checking for new or modified alert status indicative of at least a progress of an alert and receiving from the mainframe the new or modified alert status of at least a progress of an alert.

* * * * *